United States Patent

[11] 3,570,789

| [72] | Inventor | Robert W. Rainey<br>Newport News, Va. |
|---|---|---|
| [21] | Appl. No. | 837,830 |
| [22] | Filed | June 30, 1969 |
| [45] | Patented | Mar. 16, 1971 |
| [73] | Assignee | The United States of America as represented by the Administrator of the National Aeronautics and Space Administration |

[54] HIGH-SPEED FLIGHT VEHICLE CONTROL
3 Claims, 4 Drawing Figs.

[52] U.S. Cl. .................................................. 244/90
[51] Int. Cl. .................................................. B64c 9/02
[50] Field of Search .......................................... 244/90, 87, 2, 42, 43

[56] References Cited
UNITED STATES PATENTS

| 1,764,932 | 6/1930 | Chadbourne ................. | 244/3 |
| 2,511,502 | 6/1950 | Gluhareff ..................... | 244/87X |
| 3,104,079 | 9/1963 | Phillips ....................... | 244/43X |
| 3,143,317 | 8/1964 | Walley et al. ................ | 244/42 |
| 3,204,892 | 9/1965 | Powell ......................... | 244/43 |
| 3,289,974 | 12/1966 | Cohen et al. ................. | 244/2X |

Primary Examiner—Milton Buchler
Assistant Examiner—Carl A. Rutledge
Attorneys—Wallace J. Nelson, Howard J. Osborn and G. T. McCoy ABSTRACT: A vehicle having supersonic and hypersonic flight capabilities equipped with a pair of elevons on the aft end of the body and disposed with hinge lines swept forward relative to the aircraft centerline at an angle less than 90°.

PATENTED MAR 16 1971          3,570,789

*INVENTOR.*
ROBERT W. RAINEY

BY
*A. H. McCoy*
*Wallace J. Nelson*
ATTORNEYS

HIGH-SPEED FLIGHT VEHICLE CONTROL

ORIGIN OF THE DISCLOSURE

The invention described herein was made by an employee of the U.S. Government and may be manufactured and used by or for the Government for governmental purposes without the payment of any royalties thereon or therefor.

This invention relates generally to a high-speed flight vehicle control system and relates in particular to a vehicle having supersonic and/or hypersonic flight capabilities and which is controllable over the operational ranges of attitudes and Mach numbers within the sensible atmosphere.

Considerable research has been and is presently being conducted to determine designs for lifting entry vehicles capable of being safely maneuvered at the speeds experienced upon reentry into the earth's, or other planet's, atmosphere after an orbital or interplanetary space mission and to determine designs of supersonic and hypersonic vehicles capable of flight within the sensible atmosphere. One of the problems in designing such vehicles has been to provide aerodynamic controls that do not induce adverse cross-coupling when the controls are in operation. Adverse cross-coupling has previously been coped with by providing mechanical or electronic-mechanical interconnections between the controls. This prior art teaching has the obvious disadvantage of additional complexity and weight, additional power consumption and, in the event of system failure, the return of the undesirable condition of adverse cross-coupling.

Accordingly, it is an object of the present invention to provide novel control surfaces for a high-speed flight vehicle that produce an aerodynamic control output that is free of adverse aerodynamic cross-coupling.

Another object of the present invention is to provide elevons for a supersonic or hypersonic vehicle having a swept hinge line such that the aerodynamic force created by the control deflection is always in a plane that passes through or aft of the vehicle center of gravity.

Another object of the present invention is supersonic or hypersonic vehicle control surfaces that direct the yaw-producing vector of the roll control surface essentially through or near the vehicle center of gravity.

Another object of the present invention is to provide a method of determining the hinge line sweep required for elevons in a supersonic or hypersonic vehicle such that when differentially deflected the elevons will produce an aerodynamic control output at supersonic or hypersonic speeds that is free of adverse aerodynamic cross-coupling.

The foregoing and other objects are attained according to the present invention by providing a vehicle having supersonic or hypersonic flight capabilities with controls having swept hinge lines such that the aerodynamic control output is free of adverse cross-coupling. The vehicle may be manned or unmanned and of such shape as to be able to negotiate the desired flight regimes.

Elevons are added for longitudinal and lateral aerodynamic control. The hinge lines of the elevons are swept forward at an angle such that the control forces at supersonic and hypersonic speeds are in a plane that passes through or aft of the center of gravity. A suitable canopy may be provided to increase the useable vehicle volume and to provide acceptable visibility for the vehicle occupants.

A more complete appreciation of the invention and many of the attendant advantages thereof will be readily apparent as the same becomes better understood by reference to the following detailed description when considered in connection with the accompanying drawings wherein.

Figure 1:
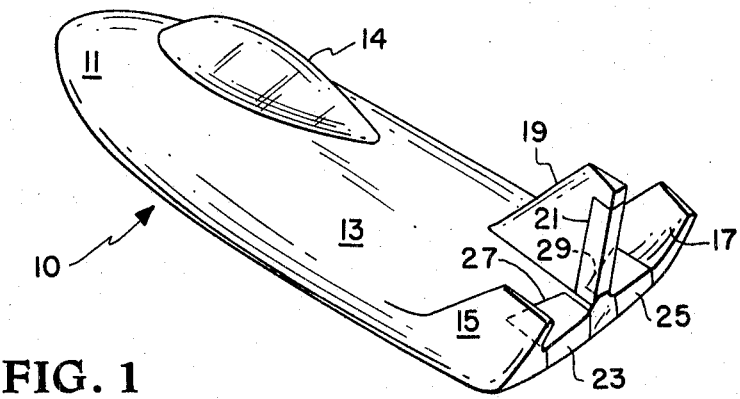
FIG. 1 is a view of an exemplary vehicle according to the present invention.
Figure 2:
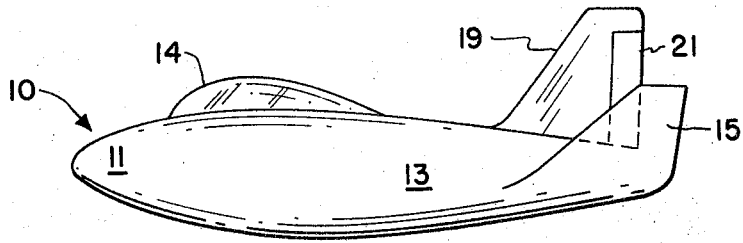
FIG. 2 is a side view of the vehicle shown in FIG. 1.
Figure 3:
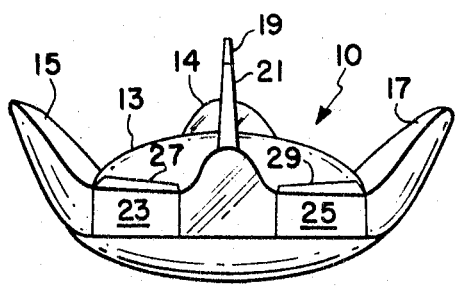
FIG. 3 is a rear view of the vehicle shown in FIG. 1.

Referring now to the drawings wherein like reference numerals refer to like parts throughout the several views and more particularly to FIGS. 1—3 there is shown a reentry vehicle according to the present invention and generally designated by reference numeral 10. Reentry vehicle 10 is essentially a wingless lifting body having supersonic and hypersonic atmospheric flight capabilities with a fuselage design having a blunt nose with a small radius and a swept body 13. The longitudinal curvature of the upper and lower surfaces of fuselage body 13 provide gradual boattailing to the fuselage to assist in avoiding transonic stability problems and to provide a desired center of usable volume in body 13. A raised canopy 14 is provided on the upper side of vehicle 10 to provide some visibility for the vehicle crew. A pair of outboard fins 15 and 17 extend from the aft end of fuselage 13. A dorsal fin 19 is provided with a conventional movable rudder 21 thereon. A pair of elevons 23 and 25 are also provided on the aft end of fuselage 13 for longitudinal and lateral control of the vehicle. Elevons 23 and 25 are provided with hinge lines 27 and 29, respectively, swept forward to the vehicle centerline at an angle less than 90°. This angular sweep is calculated such that the control forces generated by movement of elevons 23 and 25 at a supersonic and hypersonic speeds are in a plane that passes essentially through the vehicle center of gravity to thereby essentially remove any adverse yawing moment of the vehicle during roll control produced by differential elevon deflection.

Vehicle 10 is provided with a suitable propulsion system (not shown) to provide propulsion to the vehicle when needed to maneuver more than permitted in its natural glide to a selected landing site. A conventional retractable landing gear employing either wheels or skids, and not shown, is also provided for vehicle 10. Conventional control actuators, also not shown in the interest of clarity, provide for selective movement of all control surfaces in a conventional manner. A suitable thermal protective system, not designated, is provided on vehicle 10 in a conventional manner to prevent the vehicle load carrying structure from acquiring excessive temperatures as a result of the aerodynamic heating during a reentry maneuver. As in conventional reentry, suitable reaction control jets, now shown, will be activated to provide the proper attitude for vehicle 10 prior to and during the initial phases of reentry. During reentry the vehicle's aerodynamic controls are used to acquire the proper vehicle attitudes. The swept hinge line design of elevons 23 and 25 insure that the control forces generated by movement thereof at hypersonic and supersonic speeds act in a plane that passes through or aft of the vehicle center of gravity to insure that no adverse yawing moment is generated during roll control.

Figure 4:
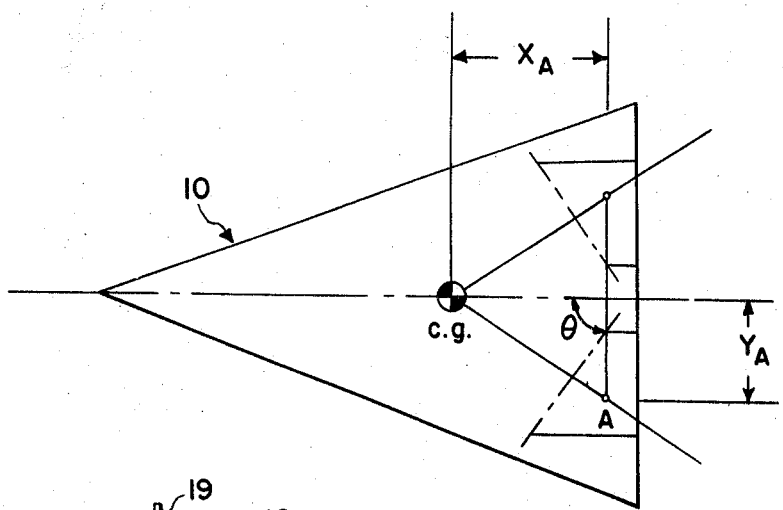
FIG. 4 is a diagrammatic view of the vehicle planform showing the angular relationship of the elevons to the vehicle.

Referring now to FIG. 4, the method of calculating the angular orientation of the hinge lines for elevons 23 and 25 will now be described. As apparent therein, at supersonic or hypersonic speeds, when the elevons are deflected differentially to produce a rolling moment, the cross-coupling or yawing moment may be either zero, adverse or proverse, dependent upon the sweep angle of the control hinge line. In this FIG., reference point c.g. designates the vehicle center of gravity while point A designates the center of area of the elevon and Θ is the sweep angle of the elevon hinge line relative to the centerline of the vehicle as shown in the plan view of FIG. 4. The dimension $X_A$ is the distance from c.g. to the center of area A of the elevon and measured parallel to the vehicle centerline. The dimension $Y_A$ is the distance from c.g. to the center of area A of the elevon measured perpendicular to the vehicle centerline. To determine the sweep angle of the elevon hinge line, assume a value of Θ less than 90° and calculate the center of area of the elevon, point A. The ordinates of point A ($X_A$, $Y_A$) are then used to calculate a value of Θ, (Θ calc). Then $$\theta \text{ calc} = \tan^{-1}\frac{X_A}{X_Y}$$

An iterative procedure is then carried out until Θ calculated ≅ Θ assumed; and for that circumstance, the yawing-moment-due-to-roll-control deflection should be approximately zero at hypersonic speeds.

For a proverse supersonic or hypersonic yawing-moment-due-to-roll-control deflection, Θ should be less than calculated by the above procedure. Similarly, for an adverse supersonic or hypersonic yawing-moment-due-to-roll-control deflection, Θ should be greater than calculated by the above procedure.

It is thus seen that when the elevons are deflected differentially to produce a rolling moment, by use of concept of the present invention the cross-coupling or yawing moment may be either zero, adverse or proverse, dependent upon the sweep angle of the control hinge line.

Although the invention has been described in reference to a specific reentry vehicle, it is equally applicable to other supersonic and hypersonic vehicles capable of flight within a sensible atmosphere. Accordingly, it is to be understood that variations and modifications may be made therein without departing from the spirit and scope of the invention as set forth in the appended claims. Thus, numerous variations and modifications will be readily apparent to those skilled in the art.

I claim:

1. An aerodynamic control system for an aircraft having supersonic or hypersonic atmospheric flight capabilities, the improvement therewith comprising a pair of elevons at the aft end of said fuselage providing longitudinal and lateral aerodynamic control of said aircraft, said elevons being provided with hinge lines swept forward relative to the aircraft centerline at a precision angle calculated less than 90° and whereby the control forces generated by movement of said elevons at supersonic or hypersonic speeds are in a plane that passes essentially through or aft of the aircraft center of gravity to thereby remove any adverse yawing moment of the aircraft during roll control produced by differential elevon deflection.

2. An aerodynamic control system for a high-speed flight vehicle capable of flight at supersonic and hypersonic speeds and provided with aerodynamic controls the output of which are free of adverse cross-coupling at supersonic and hypersonic speeds, the improvement comprising said aerodynamic controls being in the form of elevons, said elevons being provided with a precision calculated hinge line sweep angle relative to the centerline of said flight vehicle of less than 90° such that the output of said elevons is free of adverse cross-coupling at supersonic and hypersonic speeds.

3. The system of claim 1 wherein the hinge sweep angle of said elevons is calculated by the equation:

$$\theta \text{ calc} = \tan^{-1} \frac{X_A}{Y_A}$$

wherein $X_A$ and $Y_A$ are the ordinates of the center of area of control of said elevons and Θ calc is the sweep angle of said hinge line of the elevons relative to the centerline of said aircraft.